United States Patent [19]

Sweeney

[11] Patent Number: 4,460,018
[45] Date of Patent: Jul. 17, 1984

[54] ULTRALOW PRESSURE RELIEF VALVE
[75] Inventor: William R. Sweeney, Richmond, Va.
[73] Assignee: Philip Morris, Incorporated, N.Y.
[21] Appl. No.: 275,528
[22] Filed: Jun. 19, 1981
[51] Int. Cl.³ .................. F15B 21/00; G01L 19/06
[52] U.S. Cl. .................................. 137/807; 137/251; 137/804; 73/705; 73/738
[58] Field of Search .............. 137/803, 804, 807, 251; 73/705, 738; 138/89

[56] References Cited
U.S. PATENT DOCUMENTS

| | | | |
|---|---|---|---|
| 1,955,315 | 4/1934 | Styer | 73/705 |
| 2,839,923 | 6/1958 | Whitworth | 137/251 |
| 2,869,818 | 1/1959 | Fleuret | 137/251 |
| 2,987,153 | 6/1961 | Perry | 192/21.5 |
| 3,025,405 | 3/1962 | Dadas | 73/705 |
| 3,038,731 | 6/1962 | Milleron | 277/22 |
| 3,097,853 | 7/1963 | McHugh | 277/13 |
| 3,416,549 | 12/1968 | Chaney et al. | 137/81.5 |
| 3,417,771 | 12/1968 | Ernst | 137/807 |
| 3,731,651 | 5/1973 | Kuehl et al. | 188/49.5 |
| 3,763,971 | 10/1973 | Saner | 188/322 |
| 3,938,393 | 2/1976 | Morgensen et al. | 73/738 |
| 4,054,293 | 10/1977 | Hoeg et al. | 277/13 |
| 4,088,331 | 5/1978 | Farnier | 277/135 |

OTHER PUBLICATIONS

Streeter, Victor, Lo, *Fluid Mechanics,* McGraw Hill Book Co., 1971, p. 18.

*Primary Examiner*—A. Michael Chambers
*Attorney, Agent, or Firm*—A. I. Palmer, Jr.; N. A. Blish

[57] ABSTRACT

An ultralow pressure relief valve (10) is disclosed. Sealing fluid (24) is held in place by capillary forces inside capillary tube (12). When pressure in tube (11) exceeds capillary forces, sealing fluid (24) is forced into reservoir (14), protecting pressure gage (20) from overpressurization.

6 Claims, 7 Drawing Figures

ULTRALOW PRESSURE RELIEF VALVE

BACKGROUND OF THE INVENTION

This invention relates to pressure relief devices and more particularly to ultralow pressure relief valves.

DESCRIPTION OF THE PRIOR ART

Some manufacturing operations are performed at pressure differentials measuring less than one inch $H_2O$. The equipment used to monitor such small differential pressures has a small range and is easily damaged due to overpressurization. Present methods of protecting the sensitive measuring devices have several drawbacks.

One method involves use of low pressure switches and solenoid valves to vent air pressure to the atmosphere in the event of overpressurization. A disadvantage of this arrangement is that the system is slow and is also complex and expensive. This type of arrangement is also itself subject to damage from excessive variations in pressure.

Another method of protecting low pressure instruments has been use of manometers. However, this type of device has been used mainly for differential pressures in excess of one inch $H_2O$ and does not provide the accuracy necessary for differential pressures less than one inch $H_2O$.

It is, therefore, an object of the present invention to provide an ultralow pressure relief valve capable of functioning at low differential pressures.

A further object of the present invention is to provide an ultralow pressure relief valve that is relatively inexpensive.

Another object of the present invention is to provide an ultralow pressure relief valve that is simple in operation and itself is not subject to overpressure damage.

SUMMARY OF THE INVENTION

According to the present invention, the foregoing and other objects are attained by providing a capillary tube between two pressure regions with a sealing fluid that is maintained in the capillary tube by capillary attraction and which releases to relieve pressure when the pressure between the high pressure region and the low pressure region is sufficient to overcome capillary attraction. A reservoir may be provided at the end of the capillary tube to collect the sealing fluid, which allows the sealing fluid to be drawn back into the capillary tube after the overpressure condition has passed. A capillary wire may also be used to speed the resealing of the capillary tube after the overpressure condition.

BRIEF DESCRIPTION OF THE DRAWINGS

A more complete appreciation of the invention and many of the attendant advantages thereof, will be readily apparent by reference to the following detailed description when considered in connection with the accompanying drawings wherein.

DESCRIPTION OF THE PREFERRED EMBODIMENT

Figure 1:
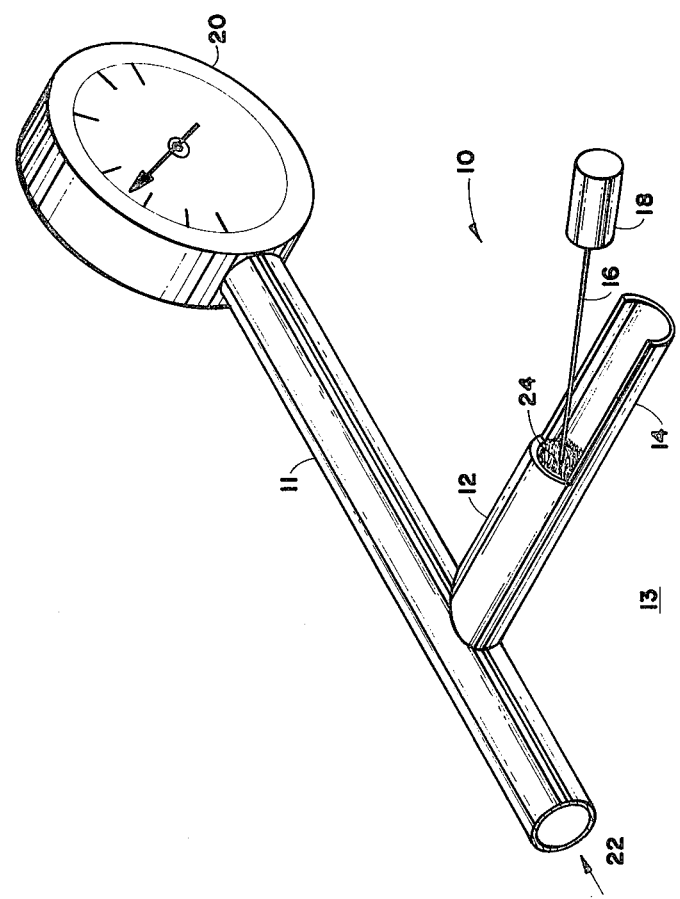
FIG. 1 is a prespective view of an ultralow pressure relief valve according to the present invention.

Referring more particularly to the drawings and specifically to FIG. 1, there is illustrated a preferred embodiment of the present invention as it would be used in an ultralow pressure relief valve, designated generally by reference numeral 10. Pressure gage 20 is connected to a pressure source, indicated by arrow 22, by connecting tube 11. Ultralow pressure relief valve 10 is also connected to tube 11. Ultralow pressure relief valve 10 is comprised of capillary tube 12, reservoir 14, capillary wire 16, and sealing fluid 24.

Sealing fluid 24 serves as a barrier between pressure 22 and atmospheric pressure 13. As long as pressure 22 does not exceed atmospheric pressure 13 by greater than the force of capillary attraction, sealing fluid 24 remains in place. If pressure 22 exceeds atmospheric pressure 13 by greater than capillary pressure, sealing fluid 24 is forced out of capillary tube 12 into reservoir 14. When pressure 22 is reduced to atmospheric pressure capillary attraction causes sealing fluid 24 to be drawn into capillary tube 12, reforming a seal at the end of capillary tube 12.

Capillary wire 16 causes sealing fluid 24 to form a seal at a faster rate than if capillary wire 16 was not present. Capillary wire 16 is mounted to wire holder 18, which maintains capillary wire 16 in a fixed relationship to capillary tube 12 and reservoir 14.

In the preferred embodiment of the invention, a capillary tube 12 with diameter of $\frac{1}{8}$ inch was used. In the preferred embodiment, sealing fluid 24 is water. Tests of ultralow relief valve 10 indicated the valve 10 relieved at a pressure of 0.2 inches $H_2O$ with a volume flow rate of 0.15 standard cubic feet per minute (scfm). The pressure relief set point can be varied within certain ranges by using fluid with different viscosity and capillary tubes with different internal diameters.

Figure 2:
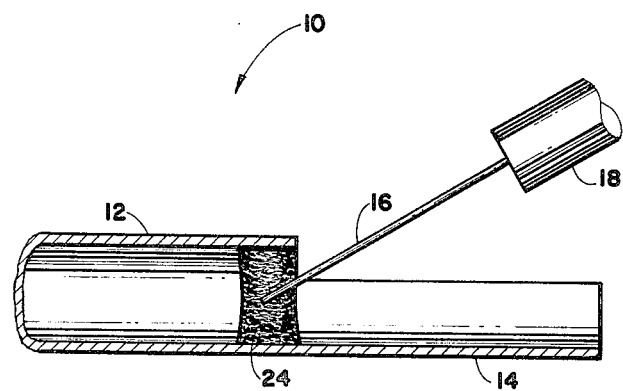
FIG. 2 is a schematic view of the ultralow pressure relief valve shown in FIG. 1.

FIG. 2 is a schematic view of ultralow pressure relief valve 10 showing the relationship between capillary wire 16, capillary tube 12, and sealing fluid 24 with the seal intact.

Figure 3:
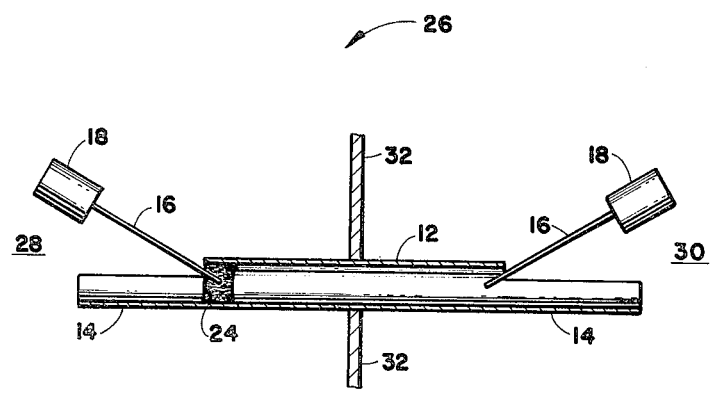
FIG. 3 is a schematic view of a differential pressure type ultralow pressure relief valve.

FIG. 3 is a schematic view of an ultralow pressure relief valve 26 designed to relieve an overpressure in either pressure region 30 or pressure region 28. This type device is useful when it is necessary to maintain two pressure areas within a certain differential range. Pressure region 28 and pressure region 30 are separated by pressure wall 32.

Figure 4:
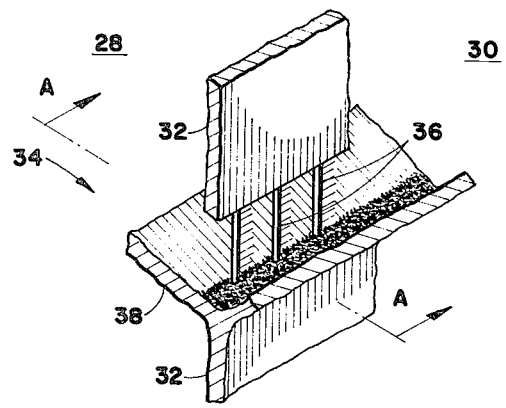
FIG. 4 is a prespective view, partially cut away, of a high volume ultralow pressure relief valve.
Figure 5:
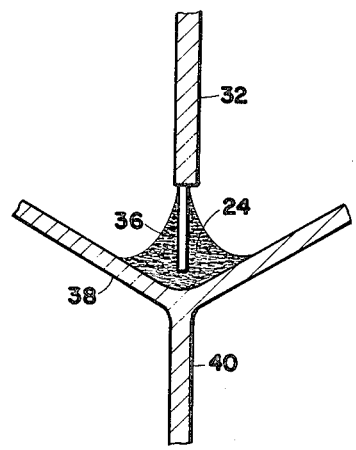
FIG. 5 is a sectional view along the lines of A—A of the ultralow pressure relief valve shown in FIG. 4.

FIGS. 4 and 5 show a high volume ultralow pressure relief valve 34. Pressure wall 32 separates first pressure region 28 and second pressure region 30. Reservoir 38 is integral with pressure wall 32 and contains sealing fluid 24 shown in FIG. 5. Capillary fingers 36, mounted on pressure wall 32, served to draw capillary fluid 24 up into a sealing position to separate first pressure region 28 and second pressure region 30. When the pressure in either region exceeds the capillary attraction force, sealing fluid 24 is forced from between capillary fingers 36 and the pressures in first pressure region 28 and second pressure region 30 are equalized. This arrangement allows a larger volume of air to be transferred while still maintaining low differential pressures.

Figure 6:
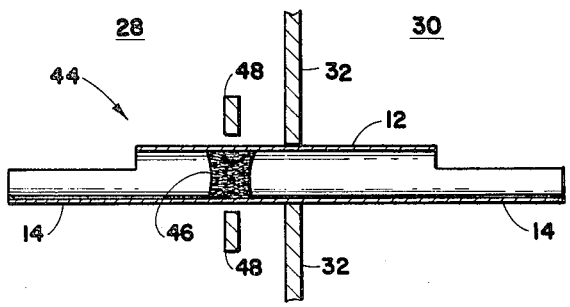
FIG. 6 is a schematic view of an ultralow pressure relief valve using magnetic sealing fluid.

FIG. 6 is a schematic view of a magnetic ultralow pressure relief valve 44. First pressure relief area 28 is separated from second pressure region 30 by pressure wall 32. Capillary tube 12 connects first pressure region 28 and second pressure region 30. Sealing fluid 46 is a magnetic type of fluid, such as those fluids produced by Ferrofluids Corporation, which is maintained in place in capillary tube 12 by capillary attraction and by the magnetic field produced by magnet 48. Magnet 48 allows capillary tube 12 to be larger, and thus relieve larger air volume flow rates, than if seal 46 were held in place by capillary attraction only. Also magnet 48 speeds reformation of the seal, after the pressures have been equalized. Magnet 48 may be either a permanent magnet or an electromagnet. If magnet 48 is an electromagnet, then the magnetic field can be varied rapidly by electric signal, allowing the pressure relief points of the ultralow pressure relief valve 10 to be changed remotely.

Figure 7:
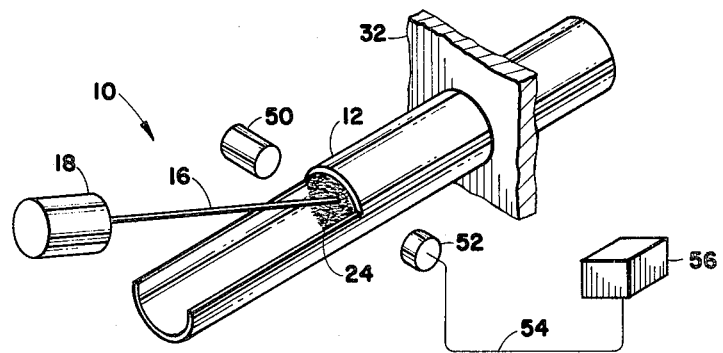
FIG. 7 is a prespective view, partially cut away, of an ultralow pressure relief valve with a photo detector.

FIG. 7 is an ultralow pressure relief valve 10 capable of detecting the presence or absence of sealing fluid 24. Light source 50 is disposed on one side of capillary tube 12 in line with detector 52 so that light from light source 50 can be detected by detector 52. In this embodiment capillary tube 12 is made of a clear material such as glass or plastic. The presence or absence of sealing fluid 24 changes the light transmission characteristics between light source 50 and detector 52. The strength of the light reaching detector 52 is transmitted by wire 54 to detector 56. Detector 56 can be set to alarm or otherwise indicate the presence or absence of sealing fluid 24, which would indicate an out of balance differential pressure condition.

It is thus seen that an ultralow pressure relief valve may be constructed simply and economically. It is also seen that an ultralow pressure relief device may be constructed in such a manner that the device itself is not damaged by overpressure conditions.

I claim:

1. An ultralow pressure relief valve comprising:
    a pressure responsive means connected to an area of high pressure;
    a capillary tube connecting the area of high pressure and an area of low pressure;
    a sealing fluid contained in said capillary tube and capable of sealing said tube by capillary attraction against low differential pressures;
    a reservoir on the low pressure side of said capillary tube; and
    a capillary wire extending from said reservoir to said capillary tube.

2. An ultralow pressure relief valve as in claim 1 wherein said capillary tube has a reservoir on the low pressure side and a reservoir on the high pressure side.

3. A high volume ultralow pressure relief valve comprising:
    a pressure wall separating a first pressure region and a second pressure region;
    a reservoir located below said pressure wall;
    a sealing fluid contained in said reservoir and capable of sealing said reservoir by capillary attraction against low differential pressures; and
    capillary fingers attached to said pressure wall extending into said sealing fluid.

4. An ultralow pressure relief valve as in claim 1 wherein said sealing fluid is
    a magnetic fluid capable of sealing said capillary tube by capillary attraction against low differential pressures and wherein
    magnets are disposed on opposite sides of said capillary tube.

5. An ultralow pressure relief valve as in claim 4 wherein said magnets are permanent magnets.

6. An ultralow pressure relief as in claim 5 wherein said magnets are electromagnets.

* * * * *